United States Patent [19]

Abild et al.

[11] Patent Number: 5,735,487
[45] Date of Patent: Apr. 7, 1998

[54] MAIN DECK CARGO DOOR CONTROL PANEL INDICATION

[75] Inventors: Vernon L. Abild, Kirkland; Stephen J. Huard, Everett, both of Wash.

[73] Assignee: The Boeing Company, Seattle, Wash.

[21] Appl. No.: 574,836

[22] Filed: Dec. 19, 1995

[51] Int. Cl.$^6$ .................... B64C 1/14; E05B 45/12
[52] U.S. Cl. ...................... 244/129.5; 340/542
[58] Field of Search ............... 244/129.4, 129.5; 49/141; 340/542, 545

[56] References Cited

U.S. PATENT DOCUMENTS

| | | | |
|---|---|---|---|
| 4,277,781 | 7/1981 | Hunyadi | 340/545 |
| 4,278,968 | 7/1981 | Arnett et al. | 340/545 |
| 4,453,161 | 6/1984 | Lemelson | 240/52 |
| 4,766,419 | 8/1988 | Hayward | 340/345 |
| 4,915,326 | 4/1990 | Plude | |
| 4,994,722 | 2/1991 | Dolan et al. | 244/129.5 |
| 5,251,851 | 10/1993 | Herrmann et al. | |
| 5,381,065 | 1/1995 | Jones | 340/545 |

*Primary Examiner*—Andres Kashnikow
*Assistant Examiner*—Virna Lissi Mojica
*Attorney, Agent, or Firm*—Conrad O. Gardner

[57] ABSTRACT

A remote indication system for a cargo door which indicates the following conditions: Opened, Closed, Latched, Unlocked and Locked. The entire system, including sensors, is independent of the standard flight deck warning system. This provides the required redundancy for the system so that direct observation is not required. An independent system from the standard flight deck warning system and/or the indication for each step of the process rather than just "open/closed" is utilized in the present cargo door control and indicating system.

2 Claims, 6 Drawing Sheets

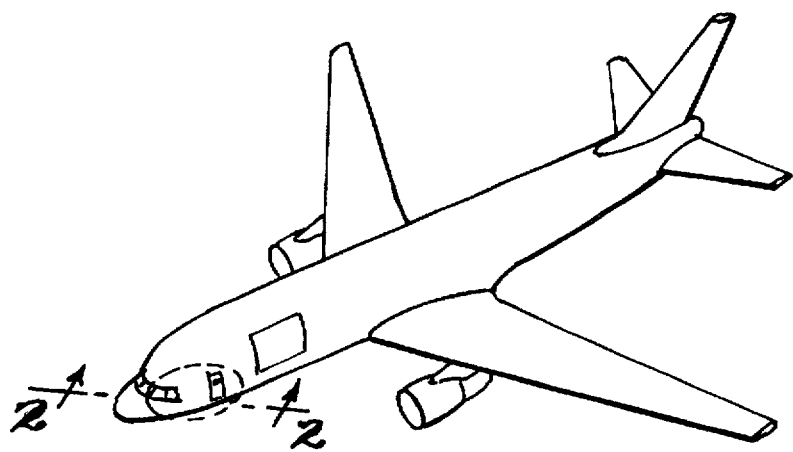
Fig.1
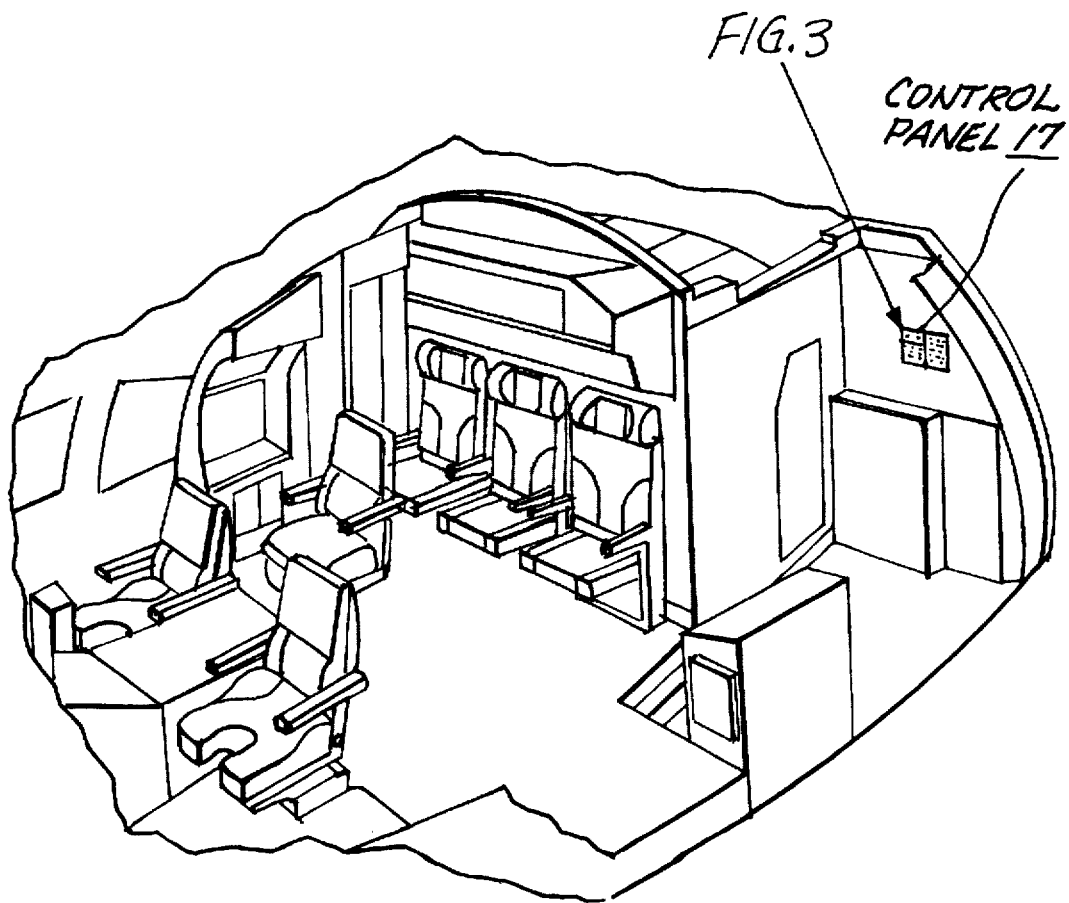
FIG.3
CONTROL PANEL 17
Fig.2.

MAIN DECK CARGO DOOR CONTROL PANEL INDICATION

BACKGROUND OF THE INVENTION

1. Field of the Invention

This invention relates to aircraft cargo doors and more particularly to cargo door control and indication.

2. Description of the Prior Art

U.S. Pat. No. 5,251,851 to Herrmann et al. shows a remotely operated passenger door for an aircraft including a remote control panel with indication of open and closed conditions. There is no provision for displaying individual elements of the conditions. Instead, the various sensor inputs are combined and processed to produce a single output. The cockpit display is also fed by the same circuit so there is no redundancy between the two systems.

U.S. Pat. No. 4,915,326 to Plude shows an aircraft exit door locking system in which an exit door is automatically locked depending on three dissimilar inputs to a locking system.

The Boeing 747-400 freighter nose cargo door provides control near the door on the main deck and provides control indication of open, closed, not closed, latched, not latched (with individual latch annunciation) and lock engaged. However, the indication is dependent on the flight deck door warning system. Earlier versions of the Boeing 747 nose cargo door control system provided control near the door and remotely from the nose landing gear. However, the control indication was limited to;

1. door up, latches unlocked and latches closed or
2. full open and full closed with individual latch annunciation.

The indication is dependent on the flight deck door warning system.

SUMMARY OF THE INVENTION

A preferred embodiment of the present invention comprises an apparatus which individually senses and indicates open, closed, latched, unlocked and locked conditions as well as monitors the change in state of these conditions for a door from a remote location. This system is independent from the existing flight deck door warning system and provides the same level of redundancy as directly observing the door.

BRIEF DESCRIPTION OF THE DRAWINGS

FIG. 1 is a perspective view of an aircraft showing the crew entry door and cargo door;

FIG. 2 is a sectional view taken along the lines 2—2 of FIG. 1 showing the flight deck and main deck cargo door control panel 17;

DESCRIPTION OF THE PREFERRED EMBODIMENT

Problem

A door operator control station located remote from the cargo door does not lend for direct observation of actual door operation. The operator control station indication needs to provide the same level of indication and redundancy as directly observing the non-plug cargo door operation.

Solution

The preferred embodiment of the present insulator provides for individually sensing and indicating Opened, Closed, Latched, Unlocked and Locked conditions as well as monitoring the change in state of these conditions offering the same level of indication as directly observing the door. Providing this indication independent from the existing flight deck door warning system provides the same level of redundancy as directly observing the door.

Description

The primary features of the present cargo door control panel indication system are:

1. Sensing and indicating open, closed, latched, unlocked and locked conditions remotely allowing the operator at the flight deck as shown in FIG. 2 to monitor the change in state of these conditions.
2. Independent sensing of door operation.

The conditions that normally are directly observed at the door by the door operator are:

Opened -door lifted sufficiently for payload loading and unloading

Closed -door positioned in body opening (door flush with the fuselage places door latch pins into door latch cams)

Latched -latch system actuated sufficiently enabling manual lock system

Unlocked -manual lock handle not stowed. This position enables the latch system (for unlatching).

Locked -manual lock handle is stowed and pressure inhibit doors are closed.

The present system senses the same operations:

Opened -door lift system opened position

Closed -door positioned in the body opening

Latched -latch system actuated sufficiently enabling the lock system

Unlocked -lock system actuated sufficiently enabling the latch system

Locked -lock system actuated sufficiently to close the pressure inhibit doors.

Figure 3:
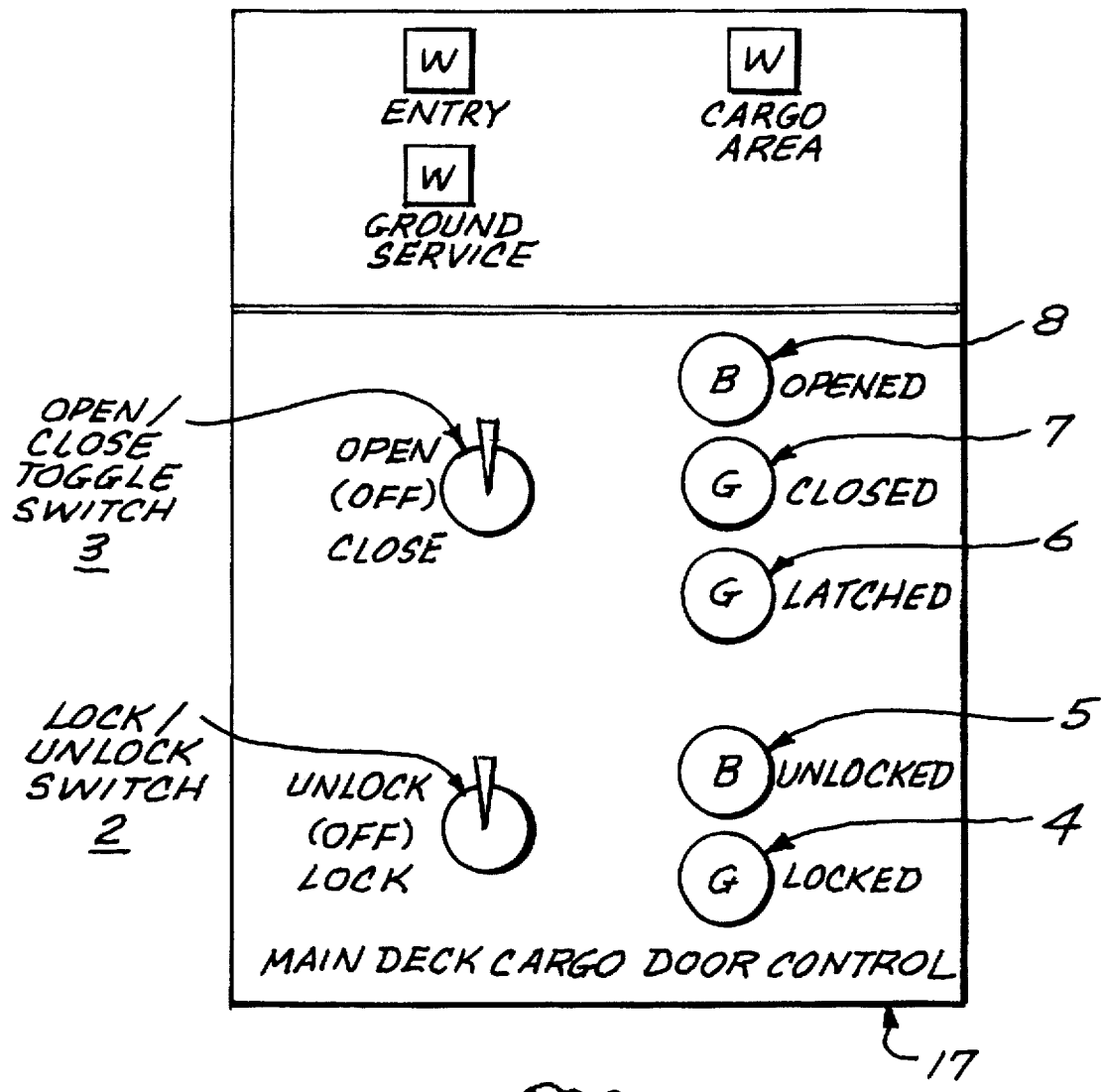
FIG. 3 is an enlarged view of the main deck cargo door control panel 17 shown in FIG. 2.
Figure 4A:
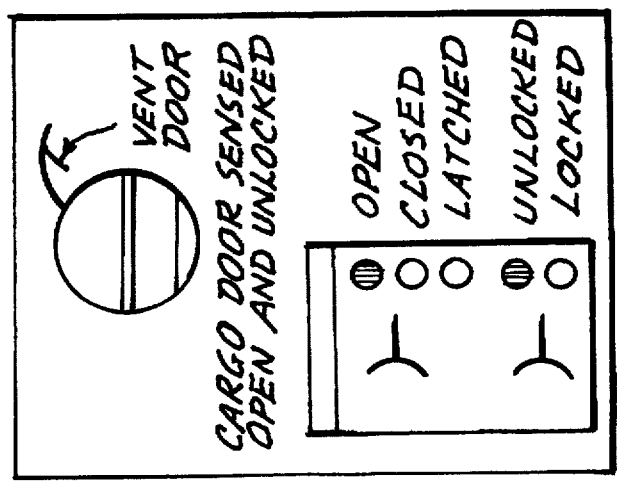
FIG. 4 is illustrative of the indication sequence on the control panel of FIG. 3 for door closing operation.
Figure 4B:
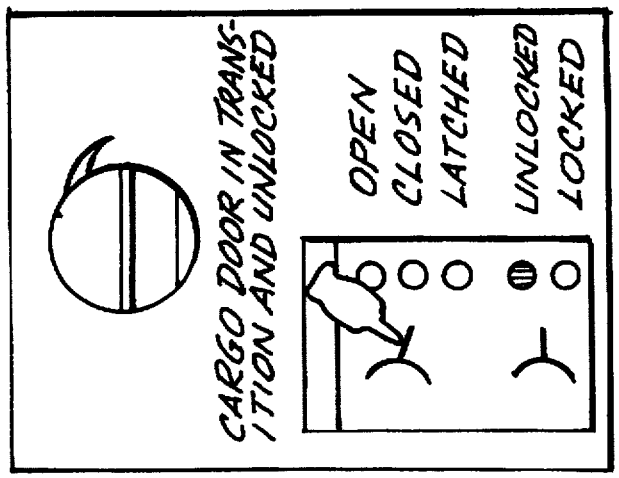
Figure 4C:
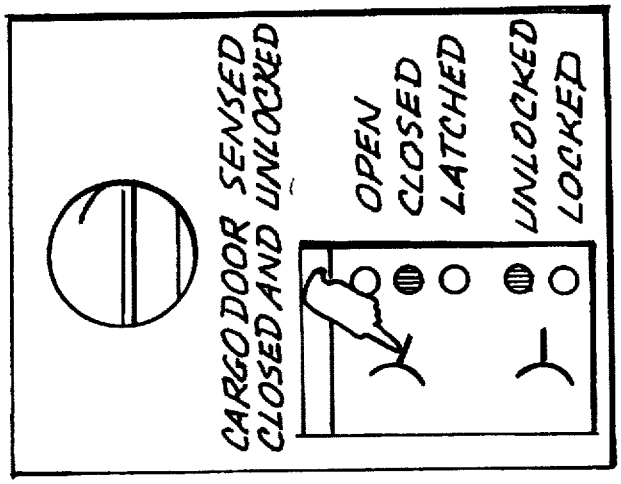
Figure 4D:
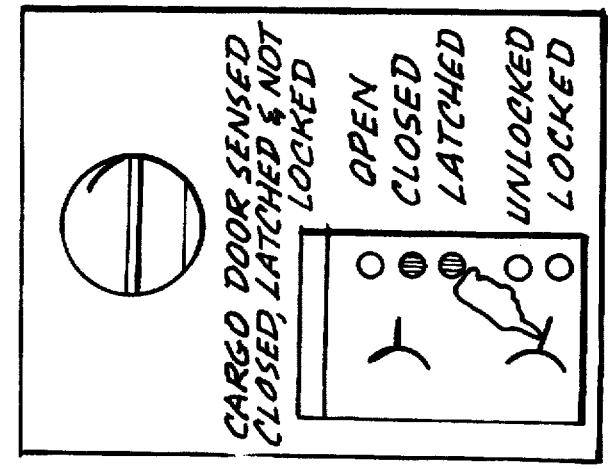
Figure 4E:
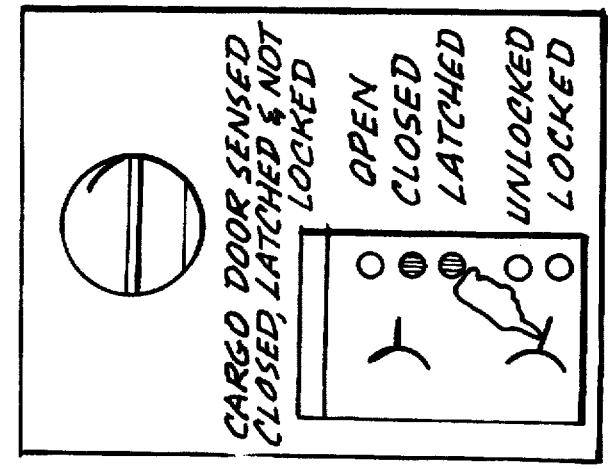
Figure 4F:
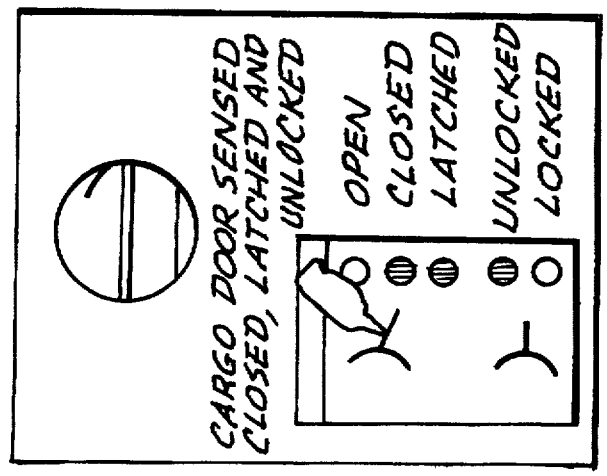

Indication of a given condition illuminates the respective control panel light shown in FIG. 3. Lack of indication of any one of these features means door is Not Opened, Not Closed, Not Latched, Not Unlocked and/or Not Locked respectively. Monitoring the change in state of these indications protects against undetected passive failures.

The door is properly secured when it is Closed, Latched and Locked. The door is properly opened when it is Unlocked and Opened.

This sensing is not dependent on flight deck warning system just as direct observation of door operation is not dependent on flight deck warning system. This provides an inherent level of redundancy.

Figure 5:
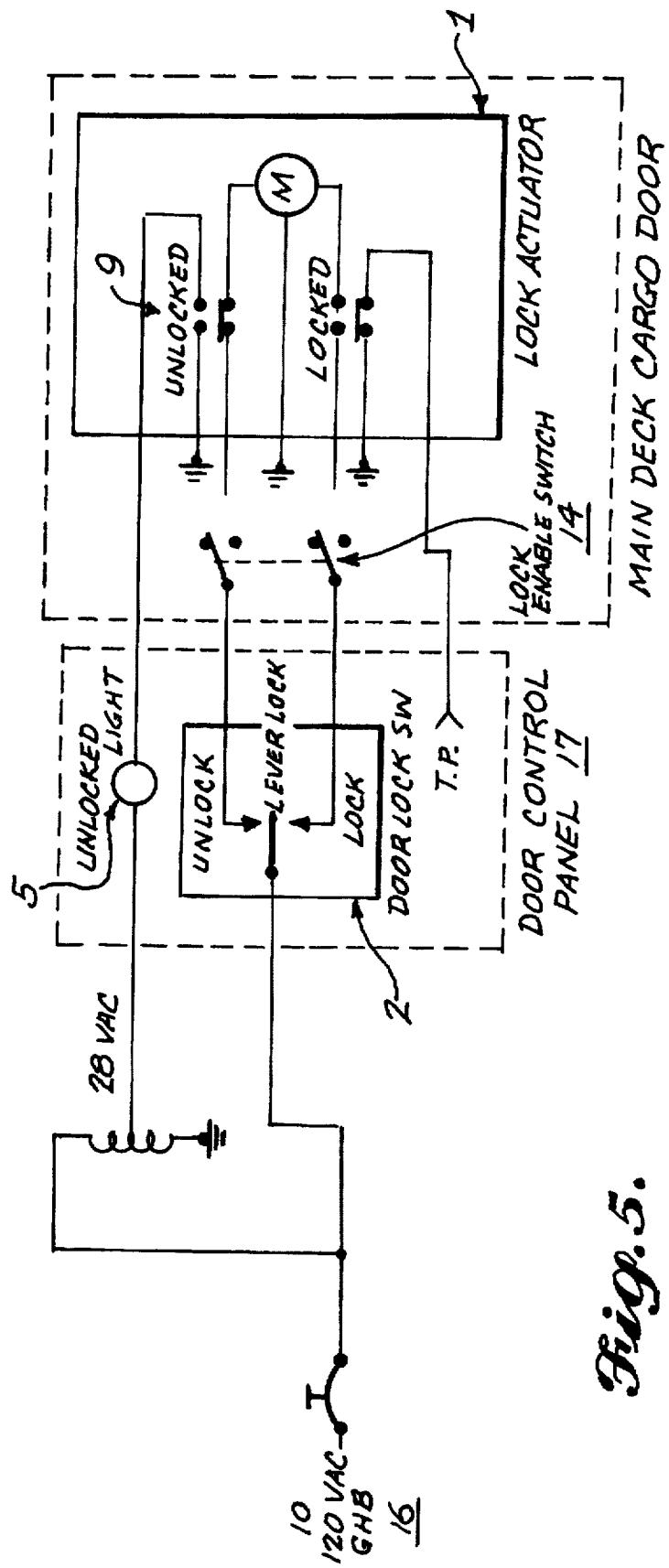
FIG. 5 is a simplified electrical schematic of the present lock control and indication system.
Figure 6:
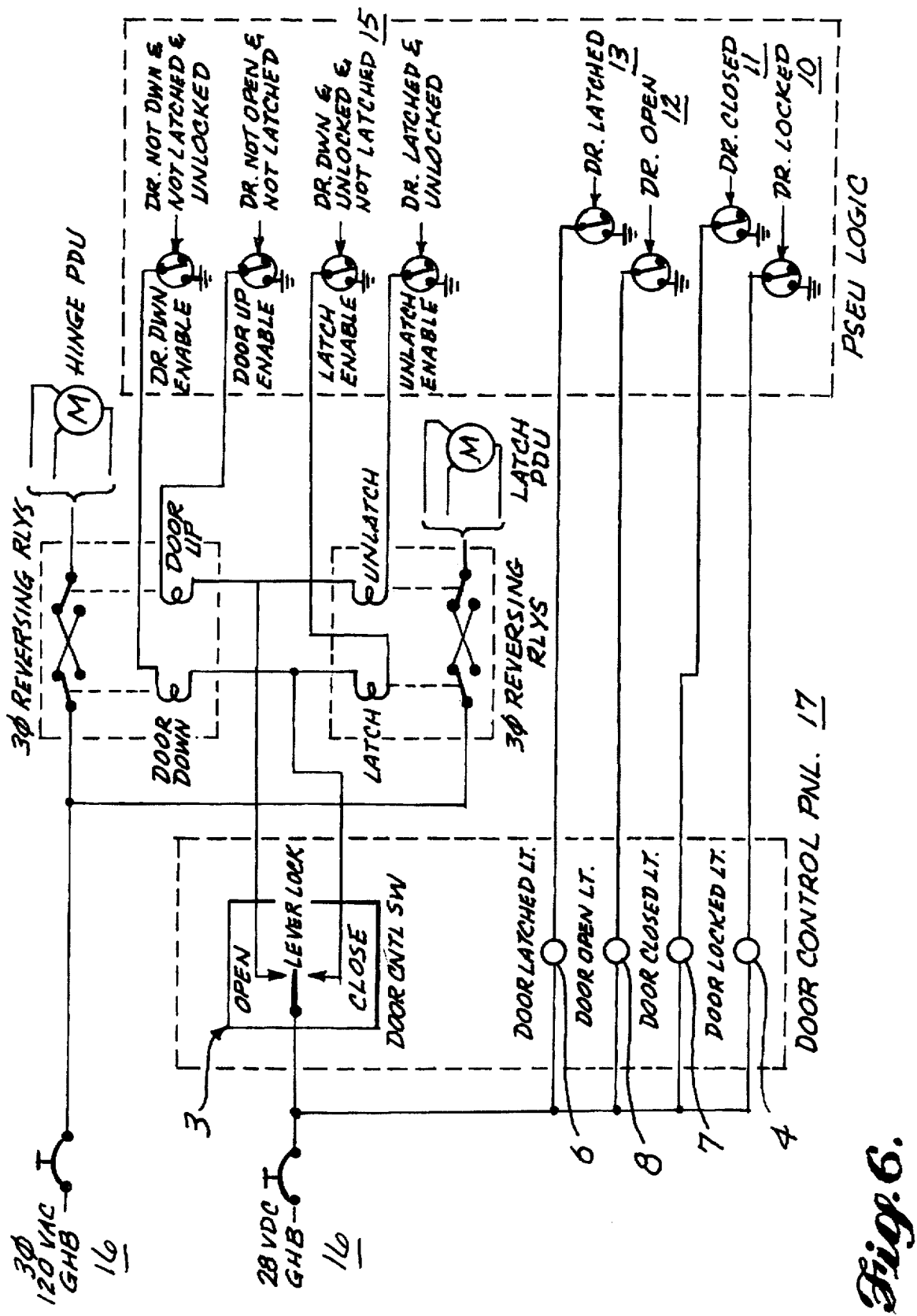
FIG. 6 is a simplified electrical schematic of the present close and latch system.

FIGS. 5 & 6 are simplified schematics of the present system showing door panel indication relationship hereinafter described in detail.

Indication lights in FIG. 3 function as follows:

With the airplane shown in FIG. 1 on the ground, external ground power connected or the auxiliary power unit operating will provide power to ground handling bus 16 shown in FIGS. 5 and 6. Ground handling bus 16 is the power source to operate the door. Refer to the Door Lock Control Circuit of FIG. 5 and the Door Open/Close and Latched Control diagrams of FIG. 6.

With the door in the fully closed, latched and locked position, the respective green CLOSED 7, LATCHED 6 and LOCKED 4 indication lights of FIGS. 3, 5 and 6 will be illuminated.

To unlock the door, the UNLOCK/LOCK toggle switch 2 on the control panel shown in FIG. 3 and 5 is held in the unlock position. The green LOCKED 4 light extinguishes as soon as the DR LOCKED 10 proximity switch senses target far. This will occur during the initial movement of the lock mechanism. Once the lock mechanism reaches the unlocked position, the UNLOCKED 9 limit switch (see FIG. 5) in the lock actuator 1 closes which illuminates the blue UNLOCKED 5 light and de-energizes the lock actuator. Release UNLOCK/LOCK toggle switch. Note: The absence of either light indicates the lock mechanism is neither fully locked or fully unlocked. Also, the latch/hook system can not be energized until the latch enable proximity switch 15 senses target near by the lock system which occurs when the lock system is in the fully unlocked position.

To open the door, the OPEN/CLOSE toggle switch 3 on the control panel of FIG. 3 is held in the open position. The green LATCHED 6 light extinguishes as soon as the DR LATCHED 13 proximity switch of the circuit schematic of FIG. 6 senses target far. This will occur during the initial movement of the latch/hook mechanism. Soon after, the green CLOSED 7 light extinguishes as soon as the DR CLOSED 11 proximity switch senses target far. This will occur during the initial movement of the door as the door is pushed out of the door opening by the latch/hook mechanism. Once the door is unlatched and pushed out, the latch/hook system is de-energized and power is transferred to the lift system. Once the door reaches the full open position, the DR OPEN 12 proximity switch senses target near which illuminates the blue OPENED 8 light (seen in FIGS. 3 and 6) and de-energizes the lift system. Release OPEN/CLOSE toggle switch. Note: The absence of any light indicates not fully opened, not fully closed and/or not fully latched respectively.

The cargo door close and door lock operations are the reverse of the open and unlock procedure. The indication lights will respond accordingly.

FIG. 4 is a pictorial helpful in understanding the central light panel sequence for the cargo door closing operation (a hatched representation representing light on and a blank showing light off). The logic provided in the circuit schematics of FIGS. 5 and 6 implement these functions as herein before described. The operation is reversed for opening. It should be further noted that lights remain on as long as ground handling bus 16 is energized.

It should be noted that the lock system can not be energized until the lock enable switch 14 is actuated by latch/hook system which occurs when the latch/hook system is in the fully latched position. Also, the central circuiting provides that at any position of the door systems, a minimum of one light is illuminated thereby providing an indication that power is available.

Those skilled in the art upon a reading of this specification will appreciate that features of the present system provide the cargo door operator the same level of indication of door operation from a remote location that is normally provided by direct observation. Also, that the present system provides the aircraft with the same level of redundancy, from the existing flight deck door warning system, that is normally provided by direct observation.

The preceding and further advantages will appear to those skilled in the art upon a reading of the foregoing specification.

While preferred embodiment of the invention has been illustrated and described, variations will be apparent to those skilled in the art. Accordingly, the invention is not to be limited to the specific embodiment illustrated and described, and the true scope of the invention is to be determined by reference to the following claims.

What is claimed is:

1. In combination in an aircraft:

a cargo door;

a cargo door control panel disposed in said aircraft remote from said cargo door;

said cargo door control panel having a plurality of panel lamps indicating opened, closed, latched, unlocked and locked positions of said cargo door; and a cargo door control and indicator circuit coupled between said cargo door and said plurality of panel lamps.

2. In combination in an aircraft:

a cargo door;

a cargo door control panel disposed in the flight deck area of the aircraft;

said cargo door control panel coupled to said cargo door for controlling the operation of said cargo door; and, said cargo door control panel indicating opened, closed, latched, unlocked, and locked conditions of said cargo door, said cargo door central panel further monitoring the change in state of said conditions.

* * * * *